US008229182B2

(12) United States Patent
Webster

(10) Patent No.: US 8,229,182 B2
(45) Date of Patent: Jul. 24, 2012

(54) THRESHOLD SCORE VALIDATION

(75) Inventor: John R Webster, Derby (GB)

(73) Assignee: Rolls-Royce PLC, London (GB)

( * ) Notice: Subject to any disclaimer, the term of this patent is extended or adjusted under 35 U.S.C. 154(b) by 914 days.

(21) Appl. No.: 11/992,936

(22) PCT Filed: Oct. 5, 2006

(86) PCT No.: PCT/GB2006/003703
§ 371 (c)(1),
(2), (4) Date: Jun. 16, 2008

(87) PCT Pub. No.: WO2007/042769
PCT Pub. Date: Apr. 19, 2007

(65) Prior Publication Data
US 2009/0003663 A1    Jan. 1, 2009

(30) Foreign Application Priority Data
Oct. 8, 2005  (GB) .................................. 0520494.6

(51) Int. Cl.
*G06K 9/00* (2006.01)
(52) U.S. Cl. ....... 382/119; 340/5.53; 340/5.83; 382/224
(58) Field of Classification Search .................. None
See application file for complete search history.

(56) References Cited

U.S. PATENT DOCUMENTS

| | | | |
|---|---|---|---|
| 4,040,010 A | 8/1977 | Crane et al. | |
| 4,724,542 A * | 2/1988 | Williford | 382/119 |
| 5,095,510 A | 3/1992 | Webster | |
| 5,251,265 A * | 10/1993 | Dohle et al. | 382/123 |
| 5,479,531 A | 12/1995 | Webster | |
| 5,647,017 A | 7/1997 | Smithies et al. | |
| 5,828,772 A * | 10/1998 | Kashi et al. | 382/119 |
| 5,995,953 A * | 11/1999 | Rindtorff et al. | 706/20 |
| 7,168,614 B2 * | 1/2007 | Kotovich et al. | 235/379 |
| 2003/0179912 A1 * | 9/2003 | Murase et al. | 382/119 |

FOREIGN PATENT DOCUMENTS

| | | |
|---|---|---|
| EP | 0 523 908 A2 | 1/1993 |
| EP | 0 612 035 A1 | 8/1994 |

* cited by examiner

*Primary Examiner* — Bhavesh Mehta
*Assistant Examiner* — Barry Drennan
(74) *Attorney, Agent, or Firm* — Oliff & Berridge, PLC

(57) ABSTRACT

A method is provided whereby confidence in a validation parameter set is achieved by comparison with a known sample of a parameter in terms of the expected template comparison score as well as mean values and deviation from that score. Thus, with respect to user individual identification, biometric parameters such as fingerprint or handwriting or voice recognition can be utilised to compare the stored template for that individual with the putative biometric response in order to determine deviation from the mean. Previous systems provided a stored template and then ranging either side to simply give a pass/fail response. By adaptation of the ranging quotient for a particular individual, a percentage confidence in the pass/fail response can be achieved. For example an individual -may have a wider range of deviation than another individual and therefore close repetition of the biometric data may be indicative of a lower percentage confidence than with an individual with a narrower deviation. Furthermore, through a learning process, the ranging quotient may he varied as a users actual response varies with age or otherwise.

16 Claims, 3 Drawing Sheets

Figure 1:
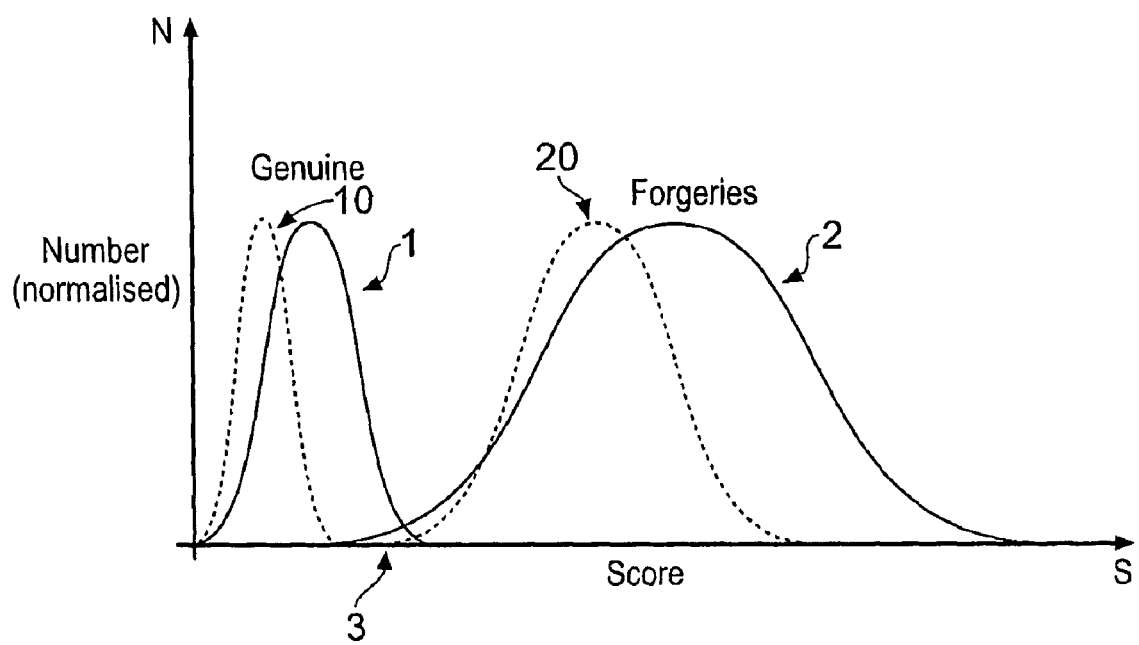

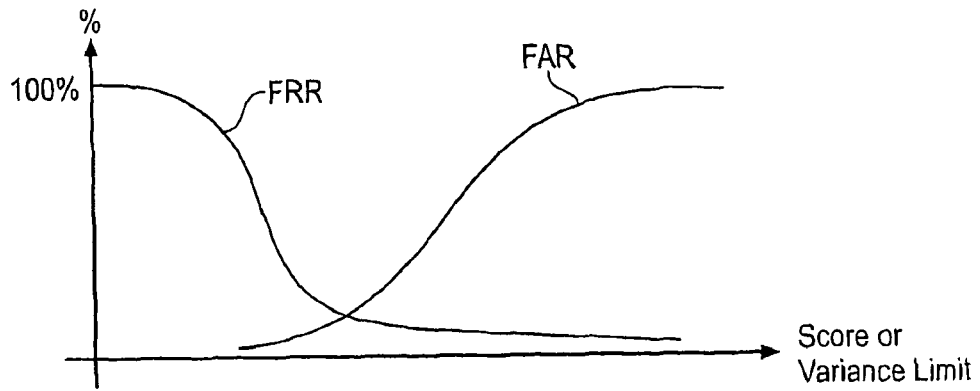
Fig. 3a
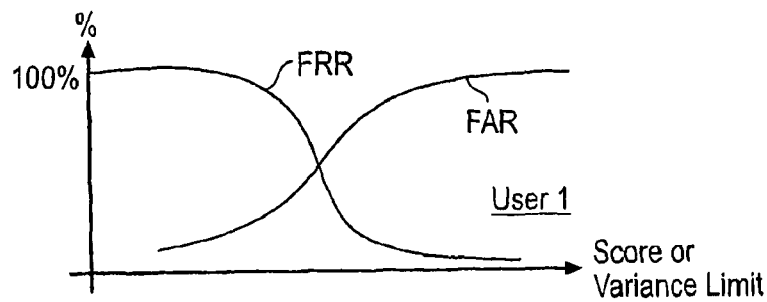
User 1
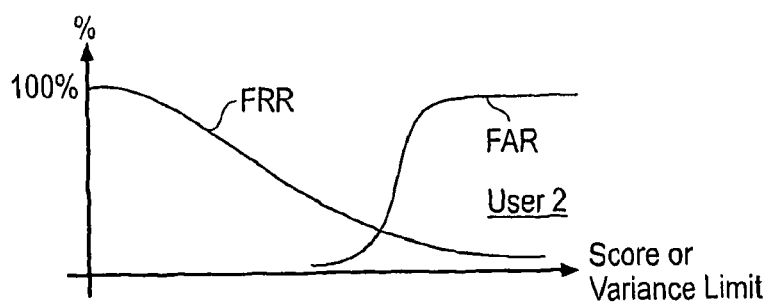
User 2
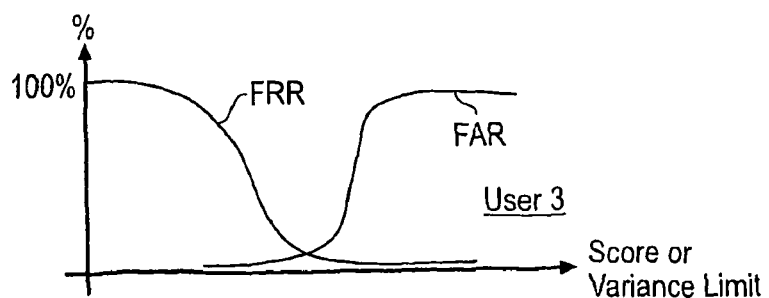
User 3
Fig. 3b
Fig. 3

THRESHOLD SCORE VALIDATION

The present invention, relates to threshold score validation determination, and more particularly to such determination used with respect to personal signature or similar biometric responses in order to confirm certainty or validation for identity of the provider of the biometric parameter.

It will be appreciated a number of biometric parameters may be utilised in order to confirm an individual's identity. Some parameters, such as an individual's fingerprint or iris pattern, are substantially user independent and so rely upon a detector device in order to check the fingerprint or iris pattern and then compare it with a known template for that individual. Other biometric parameters such as an individual's signature or voice pattern will all depend on that individual providing a sample in a controlled circumstance for comparison. In either event, it will be appreciated that there is a general variation in the biometric parameter as a result of differing calibration/sensitivity in respect to the sensing or detective device as well as through the individual producing a slightly different signature or voice pattern as a result of impetulance or simple environmental conditions produced at a cashiers desk resulting in a different signature to that produced when more time is available etc.

Previously a template has been provided for the biometric parameter. This template is stored as a result of the individual's initial registration and generally fixed for that individual. In such circumstances in use, the individual will be requested to provide the same biometric parameter for identification purposes upon a number of occasions such as for entry to a building or when performing transactions such as purchasing of goods or services.

It is known to utilise such biometric parameters as an individual's signature or voice pattern to achieve a simple pass or fail indication as to identity. Previous systems have been based upon creation of an averaged template of the biometric parameter and then comparing the putative input of the individual's presented biometric response with that template with a fixed window or allow deviation for a pass or correct signal response. Such an approach does not take account of any evolution of the individual's true biometric response as well as the inherent nature of that individual with respect to a range of potential biometric response templates. By taking a number of initial enrolment registration samples of the biometric parameters in order to create both an individual statistical distribution template for that biometric parameter and an individual range indicative of normal or actual real natural deviation of that particular individual from the stored template it is possible to provide an indication as to the confidence of the reliability of the validation in addition to a simple pass/fail signal response. For example, for an individual known to have a wide range of variation in biometric response a large deviation range will be provided so that when the individual then provides a biometric parameter for identification purposes which is close to the template average score then statistically there is a lower confidence in the response than with the individual with a narrower deviation in terms of range due to more consistency in their biometric response.

With respect to an individual's signature that signature will be offered to the cashier and compared with the template electronically stored possibly on a credit or debit card and displayed to the cashier etc or through interrogation at a central location. In either event, the individual will copy the signature or other biometric parameter once and if acceptable in comparison with the template this will be taken as confirmation as to the individual's identity. If the first signature is not acceptable in comparison with the template then a second signature maybe requested and compared to the template for acceptability. This procedure may again be repeated for a second failure with respect to a third request signature but if that should be deemed unacceptable in comparison with the template then the individual's request for identification confirmation may be refused. For confirmation a further biometric response may be required even if the first biometric response is a pass to allow confirmation or to provide an indication as to confidence or as an accepted procedure for certain types of transaction.

Each individual signature whether it be the first, second or third is independently compared with the template with normally a tolerance window for error comparison globally set for all signatures in order to allow for some deviation in the individuals biometric parameter response. Previous U.S. Pat. Nos. 5,479,531 and 5,095,510 illustrate in detail processes for verifying an individuals handwriting in order to provide confirmation as to the identity of an individual through that handwriting. These processes may be incorporated and developed in providing biometric threshold score validation procedures.

Generally, the above approaches provide a simple yes and no answer with regard to confirmation as to an individual's identity. Furthermore, the fixed tolerance deviation from the set template for an individual takes no account as to the variability with respect to an individual's response due to their character or other circumstances. Thus, previous systems have been limited with regard to providing a confidence factor with respect to the probability as to correct identify determination or with certain individuals may lead to a succession of erroneous indications as to an individual's identity which may be embarrassing to that individual and possibly lead to commercial or other losses.

In accordance with the present invention there is provided a method for determining confidence with respect to confirmation of an individual's identity by threshold score evaluation of parameters, the method comprising;

(a) separately sampling a parameter given a plurality of times to provide a sample template for each sample of the parameter;

(b) comparing each sample template and a statistical descriptor indicative of the probability range of the difference; and, (c) storing a mean similarity score and the statistical descriptor so that upon presentation of a validation parameter set for validation purposes that validation parameter set is compared to the statistical descriptor and the mean similarity score in order to provide a predictive response relative to the likelihood that the parameter is correctly identified.

Possibly, the template consists of a mean based on previous samples. Possibly, the statistical descriptor is a range quotient indicative of a probability range. Furthermore, the range quotient is a standard deviation limit above the mean.

Normally, the parameter is a biometric parameter for identification of an individual.

Normally, a biometric parameter is a signature or handwriting or voice pattern from an individual. Possibly, each biometric parameter is determined by dynamic stress variation as the biometric parameter is formed by the individual.

Generally, a validation parameter set comprises two or more parameter determinations with respect to response parameters given by an individual for identification.

Possibly, expected variation given by the expected range quotient is utilised to indicate that too close a similarity between parameters in the validation parameters set is either indicated through the predictive response as indicative of a higher likelihood that the individual is correctly identified or alternatively uncharacteristically repetitive with respect to the parameter provided by the individual and therefore indicative as to a low likelihood that the individual is correctly identified.

Possibly, the predictive response is a simple yes no or pass fail with respect to likelihood that the individual is correctly identified. Possibly, the predictive response comprises a percentage probability as to the likelihood that the individual is correctly identified.

Possibly, the validation parameter set in terms of templates is utilised to adapt the mean template and for subsequent determination as to an individual's identity.

Figure 2:
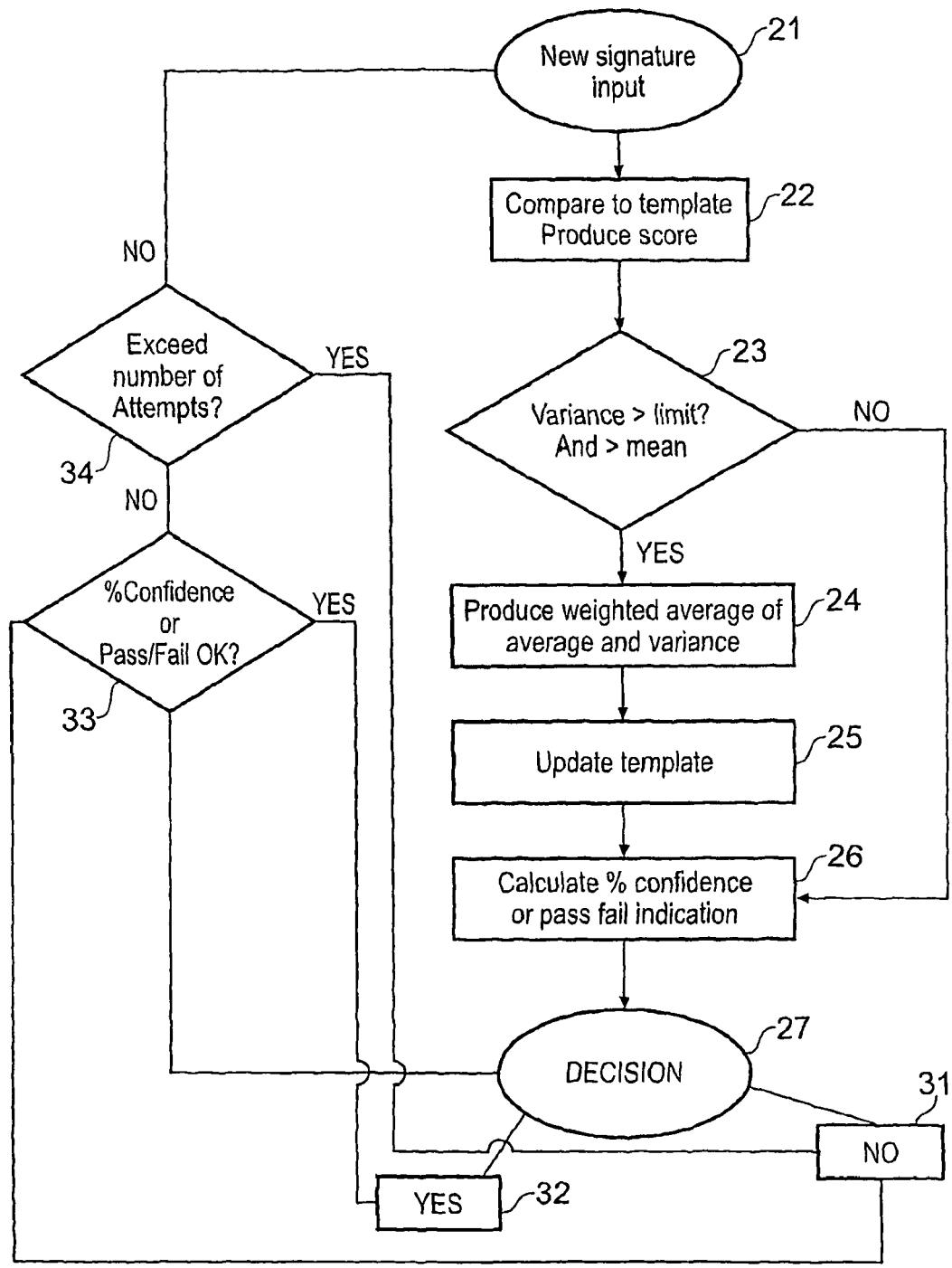

Embodiments of the present invention will now be described by way of example only with reference to the accompanying drawings in which FIG. 1 graphically depicts curves for genuine and forgeries in respect to biometric parameter responses putting the number of biometric responses taken against the divergent score of those responses;

FIG. 2 is a flow diagram illustration of the present validation score procedure; and, FIG. 3 provides respective graphical representations of the probability of false rejection ratio and false acceptance ratio generally in FIG. 3a and for comparison between users in FIG. 3b A number of processes and methods have been utilised in order to assess individual biometric responses, such as handwriting in the form of signatures or transcription of a set text. U.S. Pat. No. 5,095,510 and 5,479,531 describe use of stress wave activity in order to create a template for an individual's response.

This stress wave activity relates to the instantaneous speed and pressure applied by the individual when writing their signature or a set passage of text whilst forming letters and punctuation. Generally, the procedure is to write or recite the biometric parameters in terms of a user's signature or voice, a number of times but to reiterate several biometric responses templates which are then compared in order to create a mean template indicative of that user's average template when asked to provide the biometric parameters. Such individual validation and confirmation process and methods may be utilised with respect to electronic transactions performed through remote computer connections to a bank or otherwise provide means for identification of an individual to gain access to a building or control of machinery etc.

Confirmation of a particular individual's identity is increasingly important in order to provide access to services and buildings as well as confirmation of transactions, etc. It is known to utilise biometric parameters, such as an individual's signature or voice pattern, to provide a simple pass/fail indication as to an individual's biometric response as an indication as to identity. Previous systems have been based upon creation of an average response template of the biometric parameter and then comparing the individual's presented biometric response with that template with a fixed window or allowed deviation for a pass signal response. Such an approach does not take account of the evolution of the individual's true biometric response as well as the inherent nature of that individual with respect to the range of potential biometric response templates. By taking a number of initial enrolment samples of the biometric parameters in order to create both an individual mean template for that biometric parameter and an individual ranging quotient indicative of the deviation of that particular individual from the mean template, it is possible to provide in addition to a simple pass/fail signal response an indication as to the confidence of the reliability of validation.

FIG. 1 provides a graphic illustration of curves consistent with genuine and forged biometric responses. In this example, the distribution curves of genuine entries 1, 10 which have a higher mean and deviation tend to cause a higher universal score limit to be needed and so tend to be easier to forge. It will be seen with respect to a first individual with biometric responses given by the curve 1 there is overlapping in a region 3 with forged biometric responses given by curve 2 whilst with a second individual, genuine responses given by the distribution curve 10 do not overlap with the forged responses given by the distribution curve 20. In the present invention this knowledge is used to produce an improved method of differentiating between genuine and forged entries. This approach enables an enhancement which can give an indication of confidence instead of a simple pass/fail decision. In the example given below, the normal distribution approach is used to simplify the example. Alternative statistical distributions such as chi squared ($X^2$) would also be appropriate and would be applied in a similar way.

In this way, a pass/fail mark which is specific to the individual can be generated. An erratic signatory will tend to produce a high average score and a high variance. If a biometric system with a global pass/fail limit were to be used, this users signature would be easy to forge. If a lower global limit was chosen, this would falsely reject more of the erratic signatories entries. This can be visualised in FIG. 3 described below.

The present method essentially comprises three stages, enrolment, verification and updating. This approach allows as indicated a more sophisticated analysis of biometric data in order to achieve a more informative result. An individual's signature will be used as the biometric data source but as indicated above others may be used.

During enrolment a number of simple signatures, typically five, are generated by the individual and the biometric data gathered. This biometric data may be in terms of glide pressure of the user's pen, speed as well as typical matrix distribution of the signature line. As indicated previously, other biometric data may be used. From the sample number of signatures a template is generated as a biometric data group. Normally this template is averaged over the number of sample signatures taken, although a database for single entry could be used as an alternative. Normally the mean and standard deviation are calculated from the data recorded utilising standard formulae in order to provide an acceptable template for individual verification. However, other statistical distribution regimes may be used.

With regard to validation, each individual signature is compared to the stored validation template to produce a score. Previously this score would have provided a simple pass/fail decision indicative of the individual's identity. In accordance with the present invention the deviation of the putative signature for individual identification in comparison with the stored template is calculated and the stored mean and deviation from the validation template utilised in order to update that validation template. More importantly in accordance with the present invention each individual will be assigned a range quotient defining an acceptable limit for deviation for that particular individual user so that in addition to a simple pass/fail, an indication as to decision confidence can also be provided. Essentially, each individual as indicated will have their own deviation profile in terms of a ranging quotient. It will be understood a true individual's biometric response will show some deviation in the score indicative of deviation. An individual will not respond exactly the same way each time so there will be an expected or typical deviation in scores for that individual so unusual deviation from the expected biometric response as well as unexpected consistency or greater range of deviation will also raise concerns.

By the above approach, as indicated, typically a pass/fail or accept/reject response may be provided or as indicated a request for a retry in terms of further biometric data could be made. In any event, it is possible to provide a percentage or more integral confidence level decision in terms of the confidence that the individual is correctly identified. Thus, a percentage could be used as indicated or a graded level of confidence in the decision provided such as high, medium or low. In any event, a decision must be made as to whether the validation template and statistics in terms of mean and deviation for the individual should be updated. As indicated previously, an individual for various reasons may during the course of their life alter their response in terms of biometric data gathered. In such circumstances the present method allows for such variations to be accommodated. Generally, updating of the template and statistics (mean and deviation) will depend upon predetermined limits on the biometric score achieved by the putative individual for identification. In such circumstances, typically a limit on the value of the variants by the current putative individual's biometric data can be assessed and then provided at variances above the mean variants alteration of the ranging quotient and possibly mean value performed.

Updating will be by a method which will provide a weighting towards the latest results in terms of biometric data gathered. Such an approach is necessary to accommodate for the steady long term variations in the biometric data gathered, e.g. particularly with respect to young adults whose signatures in particular change rapidly with age, and older people as their signature slows. The template and scores will need to be adapted.

Updating of the mean and standard deviation (variance) could be performed using a relationship as outlined below.

$$x_{n+1} = x_n R + \text{in}(1-R) \quad \text{(Relationship A)}$$

where
$x_{n+1}$=new mean value
$x_n$=previous mean value
R=update ratio (usually in the range 0.9 to 1)
in=new input value
And, $$\sigma_{n+1}^2 = \sigma_n^2 R + (\text{in} - \chi_n)(1-R) \quad \text{(Relationship B)}$$

$\sigma_{n+1}$=New variance
$\sigma_n^2$=previous variance

In such circumstances, there is updating of the mean and the standard deviation in order that the current template, mean and variants create a ranging quotient. This allows provision, in addition to the simple pass/fail of previous systems and methods, of an ability to provide an indication in the form of a percentage or level of confidence in the identification of the individual.

Previous systems have simply set an upper limit of score deviation as an indicator of fraud. The present method and process still allows an upper limit test but individually set for that individual dependent upon their real actual deviation not an arbitrary limit, but also a lower limit may also be set in view of the expected deviation so again if there is unexpected consistency then this too will be a trigger for concern.

FIG. 2 illustrates in a flow chart from a typical validation procedure utilised with respect to an individual's signature. As indicated previously, this signature may create a range of different forms of biometric data such as writing sequence pressure, overlay matrix comparison of the signature line with that stored as well as signature time and movement dynamics in terms of speed and deviation, etc. Irrespective of the particular form of biometric data utilised, it will be appreciated that this data creates templates with deviation and mean values for comparison and individual identification. In FIG. 2 as can be seen, an individual presents their new signature input at box 21. This individual would already have a template stored for validation by part comparison and a similarity score generated. Thus, the putative new signature is compared in box 22 to the stored template for that individual and a score provided. This creates a similarity comparison score as indicated previously which is generally utilised in order to confirm a pass or fail with respect to individual identification.

In decision box 23, this comparison is performed in terms of deviation. If a positive or YES comparison is achieved, that is to say the score is within a variance limit and or less than a mean value then in decision box 24 a weighted average of the mean and variants as defined above by relationships A and B is determined. Furthermore, if the variance is too low or too high or too exact for an individual then this may be flagged as a fail or NO result in addition to a simple threshold as depicted. These weighted averages and variations may be utilised to update the validation template utilised in comparison box 22 in a process stage 25.

A further process stage 26 provides a percentage confidence in the confirmation of an individual's identity is provided as indicated previously, typically as a percentage but also possibly as a graded confidence level. The process box 26 receives both YES decisions via boxes 24, 25 and NO decisions directly from decision box 23. A negative or NO decision is a fail and is defined in box 23 where the score is greater than an acceptable variance limit and/or a mean value. As also indicated, if the variants and deviation are not as required (too much or too little) a fail or NO indication is provided to the process box 26 to indicate that the individual is either not the person associated with that particular template but a percentage confidence quotient will be provided in any event as an indicator used below to determine whether a re-try is justified As indicated previously, a simple confidence level in a YES decision is provided but again this can be used to determine whether a re-try is required or recommended for certain transactions.

The decision box 23 compares the score provided in the comparison made at box 22 with a statistical spread for the expected biometric data. This statistical spread may be a normal distribution profile or any other statistic distribution indicative of biometric response from an individual or sources. In fact decision box 23 can use a user specified algorithm or any protocol to accentuate or otherwise provide a validation score.

At decision box 27 a consideration of the confidence level typically in the form of a percentage is provided. Normally there will be three levels of confidence.

FAIL—The percentage confidence level is so low and below any expectation that the current individual has been identified so the process is exited by a decision flagged at a NO box 31.

YES—The percentage confidence level is above that required to be sure of correct identification of an individual and either a YES box 32 flagged or a confirmation try required by stimulating boxes 33, 34.

MAYBE—The percentage confidence level is at an intermediate value between a NO percentage confidence level and a YES percentage confidence level and a confirmatory try is required. Thus, a decision box 33 will review the percentage confidence level and dependent upon the number of tries, that is to say two or more MAYBE percentage confidence levels have been determined so a YES decision will be flagged at box 32 of that two or more MAYBE percentage confidence levels indicate a lack of confidence so the NO box 31 is flagged or a further box 34 utilised to determine whether the acceptable number of attempts to get a YES confidence level have been exceeded and if not then try again through the input 21 and comparison process as described above.

Normally, a three tries approach will be used but the number of tries may be varied dependent upon user requirements.

The present invention allows adaptation of the ranging quotient as a statistical descriptor to an individual user, taking into account the individual threshold requirements for confidence. Thus, different transactions may have different necessary levels of confidence for individual validation. The present method collects records of past results in order to define the template in terms of a mean score and deviation such that there can be a prediction as to a valid user individual's input score and this enables a better indication as to how likely it is the correct individual is identified. It is also possible utilising the present method to adapt over time the template as well as the mean and deviation depending upon an individual's trends extrapolated from a base validation which is confirmed. The particular statistical distribution can be chosen for accentuating and exaggerating or optimising results of a particular biometric response.

By providing a dynamic variation in the ranging quotient, it will be appreciated that in addition to use by the present method of biometric details putative to identify an individual in comparison with previous recorded templates for those biometric details the present method could also be used with regard to databases to predict future events dependent on past trends and so provide an indicative score dependent on current putative input of those events. Thus, for example, trends with respect to seasonal sales of products or academic results for an individual could be utilised in order to predict confidence in sales figures received from a salesman or stored in terms of audit fraud or examination results for the individual.

An update rationale could be varied based upon the percentage confidence in order to further control the updating rate of the variants and mean for confidence in the result provided. As indicated previously, variant limits may be different for different levels of action. Thus, for example purchase of a product for a few pounds may require a relatively low percentage confidence level while confirmation of validity for entry to a high security building or purchase of a high value item or service may require a far greater level of confidence to proceed.

A separate limit may also be used to determine if updating will be allowed.

Any system producing a score can be represented in a cumulative curve or False Registration Rate (FRR) and a False Acceptance Rate (FAR). This can be used to determine the score limit and demonstrate the effectiveness of the system. The ideal situation is where these two curves are completely separated, and all genuine entries are accepted and all forgeries are rejected. In practice, all systems will have some overlap, the aim of the algorithms is to minimise the overlap. It can be seen from FIG. 3a that the higher the score limit, the higher the number of genuine signatories and the numbers or forgeries will be accepted, in general, a global score limit is applied to all users, which is a compromise of minimising FAR and FRR within acceptable limits.

If a personal FAR and FRR curve is generated as shown in FIG. 3b it can be seen that an individual score limit would be more appropriate. The present invention aims to use this individual variability to provide a system which is overall more effective at increasing the separation of FAR and FRR curves. To do this, they must be represented against a more appropriate independent (X) axis on the charts. This new X axis is based on the statistical variation of an individual's signature, and now applies a global limit to this new measure.

As indicated above, in addition to biometric data, it will be appreciated that the present method may be utilised with respect to situations where data is read in from an analogue source and a notice must be given in terms of percentage confidence when a certain condition is met. This condition will not be static and must be dependent on previous data giving the system a degree of intelligence that a human possesses in this task, that is to say a degree of intuition with respect to confidence in the data received.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method for determining confidence with respect to confirmation of an identity of an individual by threshold score evaluation of a biometric response of the individual, the method comprising:
   performing a biometric response comparison by comparing the biometric response to a stored validation template to produce a score for the biometric response; and
   performing a test by testing the produced score against an upper limit and a lower limit that are defined using a statistical distribution indicative of an individual's variance of an expected score for the biometric response from the individual in order to determine a confidence value with respect to confirmation of the identity of the individual.

2. A method as claimed in claim 1, wherein the test uses a mean score and a deviation.

3. A method as claimed in claim 1, wherein the test determines whether the score is within a variance limit and/or less than a mean value.

4. A method as claimed in claim 1, wherein the test uses an expected deviation of scores.

5. A method as claimed in claim 1, wherein the stored validation template comprises a statistical mean based on previous biometric responses of the individual.

6. A method as claimed in claim 1, wherein the biometric response is a signature or handwriting or voice pattern from the individual.

7. A method as claimed in claim 1, wherein each biometric response is determined by dynamic stress wave variation as the biometric response is formed by the individual.

8. A method as claimed in claim 1, wherein the confidence value is a yes/no or pass/fail with respect to a likelihood that the individual is correctly identified or the confidence value comprises a percentage probability as to the likelihood that the individual is correctly identified.

9. A method as claimed in claim 8, wherein a pre-determined percentage probability value is used to provide a yes/no answer.

10. A method as claimed in claim 1, wherein the biometric response is used to adapt the stored validation template that is then used for subsequent determination as to the identity of the individual.

11. A method as claimed in claim 10, wherein a decision to update the template is based upon the confidence value.

12. A method as claimed in claim 1, wherein the score is used to adapt the upper limit and the lower limit that are then used for subsequent determination as to the identity of the individual.

13. A method as claimed in claim 11, wherein a decision to update the upper limit and the lower limit is based upon the confidence value.

14. A processor configured to:
   perform a biometric response comparison by comparing a biometric response of an individual to a stored validation template to produce a score for the biometric response; and
   perform a test by testing the produced score against an upper limit and a lower limit that are defined using a statistical distribution indicative of an individual's variance of an expected score for the biometric response from the individual in order to determine a confidence value with respect to confirmation of the identity of the individual.

15. A system for determining confidence with respect to confirmation of an identity of an individual by threshold score evaluation of a biometric response of the individual, the system configured to:
   perform a comparison of the biometric response to a stored validation template to produce a score for the biometric response; and
   perform a test by testing the produced score against an upper limit and a lower limit that are defined using a statistical distribution indicative of an individual's variance of an expected score for the biometric response from the individual in order to determine a confidence value with respect to confirmation of the identity of the individual.

16. A system as claimed in claim 15, configured to determine each biometric response by dynamic stress wave variation as the biometric response is formed by the individual using handwriting.

* * * * *